United States Patent
Eris et al.

(10) Patent No.: US 12,045,169 B2
(45) Date of Patent: Jul. 23, 2024

(54) HARDWARE CONFIGURATION SELECTION USING MACHINE LEARNING MODEL

(71) Applicant: Advanced Micro Devices, Inc., Santa Clara, CA (US)

(72) Inventors: Furkan Eris, Boston, MA (US); Paul S. Keltcher, Boxborough, MA (US); John Kalamatianos, Boxborough, MA (US); Mayank Chhablani, Boxborough, MA (US); Alok Garg, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/133,581

(22) Filed: Dec. 23, 2020

(65) Prior Publication Data

US 2022/0197809 A1 Jun. 23, 2022

(51) Int. Cl.
*G06F 12/0862* (2016.01)
*G06F 16/901* (2019.01)
*G06N 20/00* (2019.01)

(52) U.S. Cl.
CPC ...... *G06F 12/0862* (2013.01); *G06F 16/9027* (2019.01); *G06N 20/00* (2019.01)

(58) Field of Classification Search
CPC .. G06F 16/9027; G06F 12/0862; G06N 20/00
See application file for complete search history.

(56) References Cited

U.S. PATENT DOCUMENTS

| | | | |
|---|---|---|---|
| 2009/0152357 A1* | 6/2009 | Lei | G06Q 50/18 |
| | | | 235/454 |
| 2009/0327274 A1* | 12/2009 | Kejriwal | G06F 16/951 |
| | | | 707/999.005 |
| 2016/0357677 A1 | 12/2016 | Hooker et al. | |
| 2017/0123985 A1 | 5/2017 | Hooker et al. | |
| 2018/0314524 A1 | 11/2018 | Keskin et al. | |
| 2018/0314533 A1 | 11/2018 | Azhen et al. | |
| 2019/0138451 A1 | 5/2019 | Alam et al. | |
| 2019/0361808 A1* | 11/2019 | Subramanian | G06N 20/00 |
| 2020/0097411 A1 | 3/2020 | Pusdesris et al. | |
| 2020/0192811 A1 | 6/2020 | Harnik et al. | |
| 2020/0409851 A1* | 12/2020 | Kalamatianos | G06F 16/2246 |
| 2022/0067816 A1* | 3/2022 | Miyassi | G06Q 30/0635 |

OTHER PUBLICATIONS

Liao, Shih-wei, et al. "Machine Learning-Based Prefetch Optimization for Data Center Applications", Proceedings of the Conference on High Performance Computing Networking, Storage and Analysis, Article No. 56, ACM, 10 pgs., Nov. 2009.

(Continued)

*Primary Examiner* — Baboucarr Faal
(74) *Attorney, Agent, or Firm* — Volpe Koenig

(57) ABSTRACT

Techniques for identifying a hardware configuration for operation are disclosed. The techniques include applying feature measurements to a trained model; obtaining output values from the trained model, the output values corresponding to different hardware configurations; and operating (Continued)

according to the output values, wherein the output values include one of a certainty score, a ranking, or a regression value.

20 Claims, 5 Drawing Sheets

(56) References Cited

OTHER PUBLICATIONS

Hashemi, Milad, et al., "Learning Memory Access Patterns", (retrieved from: https://arxiv.org/pdf/1803.02329), 15 pgs., Mar. 6, 2018.
Jimenez, Victor, et al., "Making Data Prefetch Smarter: Adaptive Prefetching on POWER7", Proceedings of the 21st International Conference on Parallel Architectures and Compilation Techniques, pp. 137-146, Sep. 2012.
Dhopdapkar, Ashutosh S. et al., "Managing Multi-Configuration Hardware via Dynamic Working Set Analysis", Proceedings of the 29th Annual International Symposium on Computer Architecture, pp. 233-244, May 2002.
Ebrahimi, Eiman, et al., "Techniques for Bandwidth-Efficient Prefetching of Linked Data Structures in Hybrid Prefetching Systems", 15th International Symposium on High Performance Computer Architecture, pp. 7-17, Feb. 2009.
Ki, Ando, et al., "Adaptive Data Prefetching Using Cache Information", Proceedings of the 11th International Conference on Supercomputing, pp. 204-212, Jul. 1997.
Ramos, Luis, et al., "Low-Cost Adaptive Data Prefetching", Proceedings of the 14th International Euro-Par Conference on Parallel Processing, pp. 327-336, Aug. 2008.
Vanderwiel, Steven P., et al., "Data Prefetch Mechanisms", ACM Computing Surveys (CSUR), vol. 32, Issue 2., pp. 174-199, ACM, New York, NY, Jun. 2000.
Falsafi, Babak, et al., "A Primer on Hardware Prefetching", Synthesis Lectures on Computer Architecture, vol. 9, No. 1, pp. 1-67, Morgan & Claypool Publishers, 2014.
Quinlan, J. R., "Induction of Decision Trees", Machine Learning, vol. 1, Issue 1, pp. 81-106, Kluwer Academic Publishers, Hingham, MA, USA, Mar. 1986.
Quinlan, J. R., "C4.5: Programs for Machine Learning", 304 pages, Morgan Kaufmann Publishers, San Mateo, CA, United States, 1993.
Loh, Wei-Yin, "Classification and Regression Trees", WIREs Data Mining and Knowledge Discovery, vol. 1, Jan./Feb. 2011, pp., 14-22, John Wiley & Sons, Inc., 2011.
Kass, G. V., "An Exploratory Technique for Investigating Large Quantities of Categorical Data", Applied Statistics, vol. 29, No. 2, pp. 119-127, 1980.
Friedman, Jerome H., "Multivariate Adaptive Regression Splines", The Annals of Statistics, vol. 19, No. 1, pp. 1-67, 1991.
Hothorn, Torsten, et al., "ctree: Conditional Inference Trees", The Comprehensive R Archive Network, 34 pages, 2015.
Ho, Tin Kam, "Random Decision Forests", Proceedings of the 3rd International Conference on Document Analysis and Recognition vol. 1, p. 278-282., IEEE Computer Society, Washington, DC, US, Aug. 1995.
Polaka, Inese et al., "Clustering-Based Decision Tree Classifier Construction", Technological and Economic Development of Economy, vol. 16, No. 4, pp. 765-781, 2010.
Pang, M., et al., "Improving Deep Forest by Confidence Screening", IEEE International Conference on Data Mining, IEEE, 6 pgs., 2018.
Ho, T. K., "The Random Subspace Method for Constructing Decision Forests", IEEE Transactions on Pattern Analysis and Machine Intelligence, vol. 20, No. 8, IEEE, 13 pgs., Aug. 1998.
Rodriguez, J. J., et. al., "Rotation Forest: A New Classifier Ensemble Method", IEEE Transactions on Pattern Analysis and Machine Intelligence, vol. 28, No. 10, 12 pgs., Oct. 2006.
Kuncheva, L. I., & Rodriguez, J. J., "An Experimental Study on Rotation Forest Ensembles", Lecture Notes in Computer Science, vol. 4472, Springer-Verlag, Berlin, Heidelberg, 10 pgs, 2007.
Criminisi, A., et al., "Decision Forests: A Unified Framework for Classification, Regression, Density Estimation, Manifold Learning and Semi-Supervised Learning", Foundations and Trends in Computer Graphics and Vision, vol. 7, Nos. 2-3, 150 pgs., 2012.
Fornaser, A., et al., "Sigma-z Random Forest, Classification and Confidence", Measurement Science and Technology, 30, 13 pgs., Dec. 2018.
Bhattacharyya, S., "Confidence in Predictions from Random Tree Ensembles", IEEE 11th International Conference on Data Mining, IEEE, 10 pgs., 2011.

* cited by examiner

HARDWARE CONFIGURATION SELECTION USING MACHINE LEARNING MODEL

BACKGROUND

Cache memories are frequently present in computer systems to guard against the latency associated with accessing data in system memory. Computer systems with cache memories often implement prefetching algorithms to reduce the miss rate. Prefetching algorithms fetch information into caches, where the information that is fetched is predicted by the algorithm to be used by software at a future time. Improvements to prefetching algorithms are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for identifying a hardware configuration for operation are disclosed. The techniques include applying feature measurements to a trained model; obtaining output values from the trained model, the output values corresponding to different hardware configurations; and operating according to the output values, wherein the output values include one of a certainty score, a ranking, or a regression value.

Figure 1A:
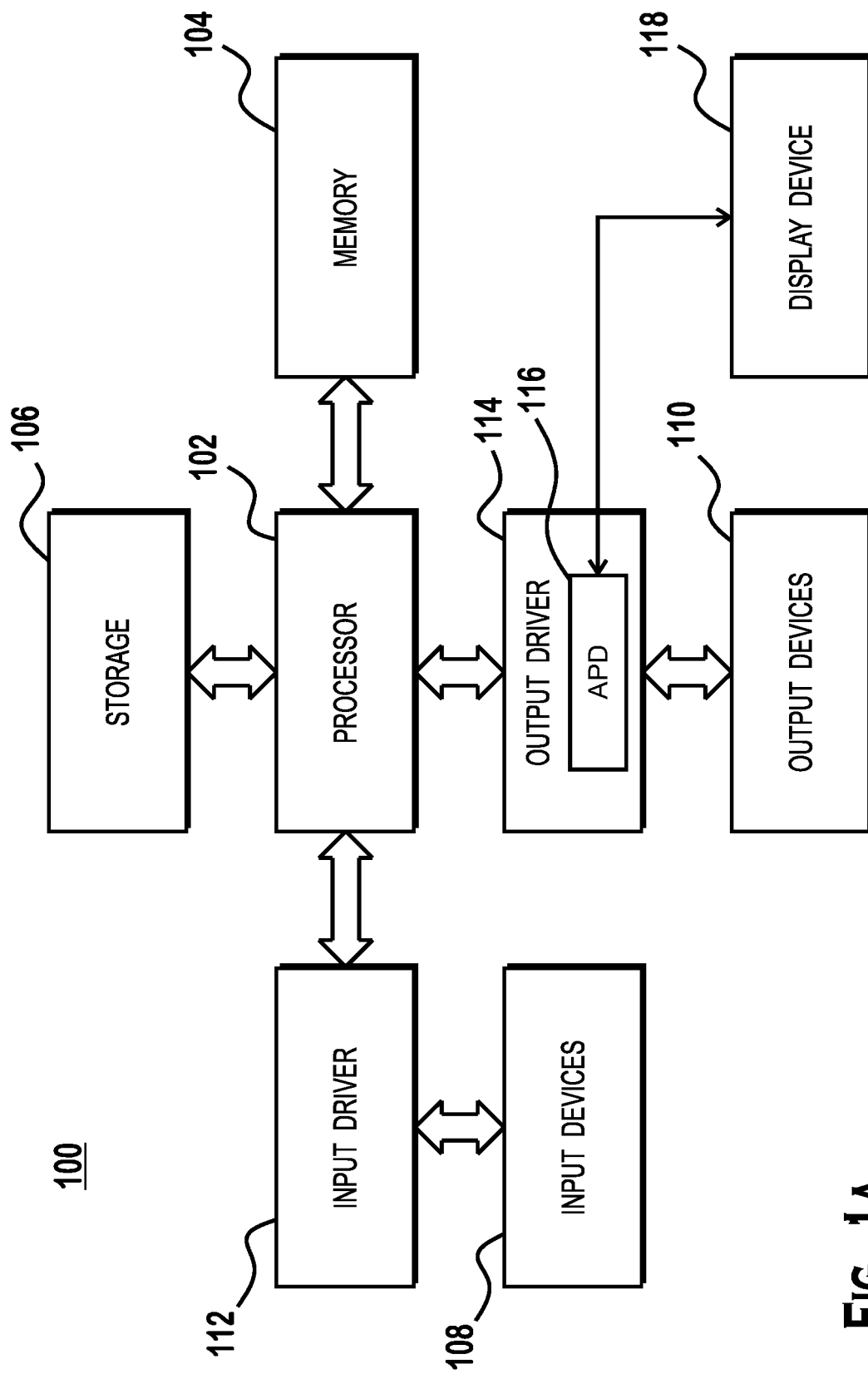
FIG. 1A is a block diagram of an example computing device in which one or more features of the disclosure can be implemented.

FIG. 1A is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes one or more processors 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1A.

In various alternatives, the one or more processors 102 include a central processing unit (CPU), a graphics processing unit (GPU), a CPU and GPU located on the same die, or one or more processor cores, wherein each processor core can be a CPU or a GPU. In various alternatives, the memory 104 is located on the same die as one or more of the one or more processors 102, or is located separately from the one or more processors 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that interface with and drive input devices 108 and output devices 110, respectively. The input driver 112 communicates with the one or more processors 102 and the input devices 108, and permits the one or more processors 102 to receive input from the input devices 108. The output driver 114 communicates with the one or more processors 102 and the output devices 110, and permits the one or more processors 102 to send output to the output devices 110.

In some implementations, the output driver 114 includes an accelerated processing device ("APD") 116. In some implementations, the APD 116 is used for general purpose computing and does not provide output to a display (such as display device 118). In other implementations, the APD 116 provides graphical output to a display 118 and, in some alternatives, also performs general purpose computing. In some examples, the display device 118 is a physical display device or a simulated device that uses a remote display protocol to show output. The APD 116 accepts compute commands and/or graphics rendering commands from the one or more processors 102, processes those compute and/or graphics rendering commands, and, in some examples, provides pixel output to display device 118 for display. The APD 116 includes one or more parallel processing units that perform computations in accordance with a single-instruction-multiple-data ("SIMD") paradigm.

The processors 102 and/or APD 116 include one or more cache memories. Example cache memories include data caches that store data to be operated on by executed instructions and instruction caches that store instructions for execution. In some implementations, the caches are organized in a cache hierarchy. In a cache hierarchy, caches that are lower in the hierarchy have a higher latency but larger capacity and caches that are higher in the hierarchy have a lower latency but smaller capacity. A hierarchical arrangement allows cache misses in one cache to have the possibility of fetching data from a cache that is lower in the hierarchy, rather than from a backing store such as system memory, which reduces overall latency.

In use, a processor operation (such as accessing data or fetching an instruction) attempts to access data or instructions at a particular memory address. If a cache does not contain the accessed data or instruction, the access is said to miss in the cache and the requested data or instruction must be fetched from a lower level cache or a backing store. Cache misses thus represent a substantial degradation in performance.

To combat the decreased performance associated with cache misses, computing systems often implement cache pre-fetching. Cache pre-fetching is a technique whereby certain data or instruction is "predicted" to be needed in the future and is fetched before an anticipated access to that data or instruction occurs. A very large variety of prefetch algorithm types exist. Some examples for instruction cache prefetching include fetch-directed-instruction-prefetching, next-line prefetching, and branch-predictor-directed prefetching. Other types of instruction prefetching exist as well. Some examples for data cache prefetching include stride-based prefetching, stream based prefetching, and other more complicated methods such as temporal streaming and Markov prefetchers.

It is possible to use multiple prefetching techniques simultaneously, in a technique known as hybrid prefetching. Hybrid prefetching allows different techniques, applied at the same time, to generate a different stream of (instruction or data) addresses to prefetch. It is not always optimal to enable all individual prefetching techniques of a hybrid prefetcher. Provided herein are techniques for controlling a hybrid prefetcher to enable or disable individual prefetching techniques depending on measured operational aspects of the computing device to which the prefetching is being applied. It should be understood that while the techniques disclosed herein are for selecting hybrid prefetcher configurations discussed herein, the techniques disclosed could be applied for selection between any of a variety of hardware configurations that do not involve cache prefetching. In such examples, a trainer would generate a trained model for selecting a hardware configuration using the principles described herein, and an inference system would apply feature measurements to the trained model in order to select a hardware configuration using the principles described herein.

Figure 1B:
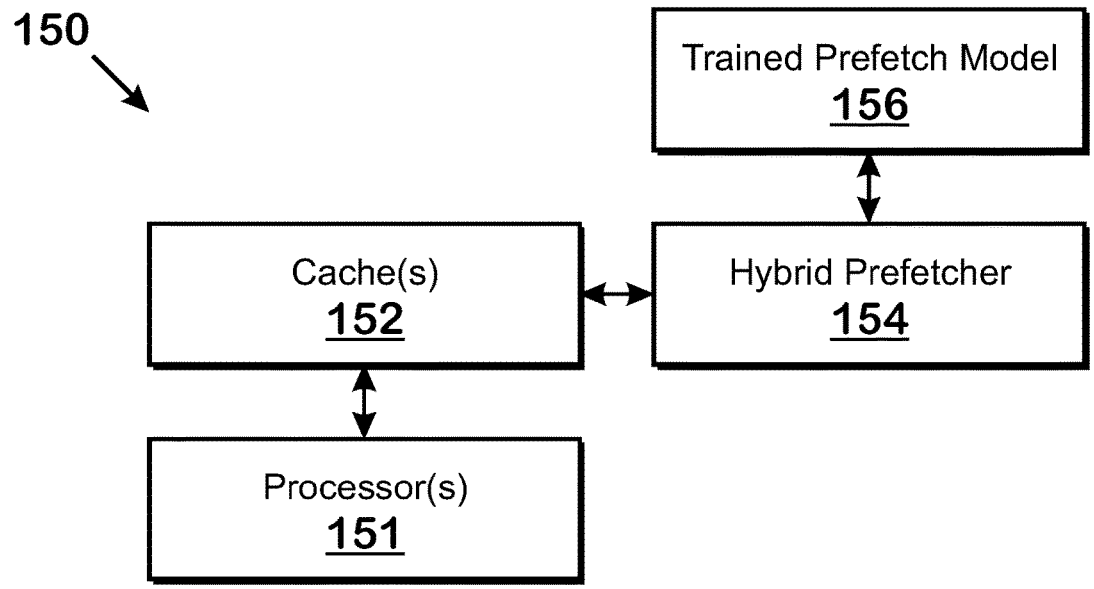
FIG. 1B is a block diagram of a prefetching system according to an example.

FIG. 1B is a block diagram of a prefetching system 150 according to an example. The prefetching system 150 includes one or more processors 151, one or more caches 152, a hybrid prefetcher 154, and a trained prefetch model 156. The hybrid prefetcher 154 is implemented in any technically feasible manner, including as software or firmware executing on a processor executing instructions that perform the techniques described herein, as fixed function circuitry, such as an application specific integrated circuit, or in any other technically feasible manner. In an example, the prefetching system is a part of the device 100 of FIG. 1A. In various examples, the processors 151 are any of the processors 102 or processors in the APD 116, or another processor not illustrated or described. In various examples, the trained prefetch model 156 is data stored in any technically feasible location such as a memory, a cache, and/or a non-volatile memory or storage device.

The trained prefetch model 156 is a trained machine learning model that the hybrid prefetcher 154 uses to make decisions regarding which prefetch techniques to use, given measurements obtained from the one or more processors 151. In an example, the trained prefetch model 156 includes one or more decision trees that the hybrid prefetcher 154 traverses to obtain a decision regarding which prefetch technique to use. In other examples, a trained prefetch model 156 that is not based on trees is used. It should be noted that, although it is sometimes stated herein that the hybrid prefetcher 154 reconfigures itself based on the trained prefetch model 156, it should be understood that in alternative implementations, any other unit, such as the CPU 102 or another hardware or software unit, performs the reconfiguration for the hybrid prefetcher 154, which performs prefetching according to that new configuration. The term "prefetcher reconfiguration unit" refers to the element that performs this reconfiguration. In various examples, this reconfiguration unit is the hybrid prefetcher 154 or is another unit that is implemented in hardware (e.g., circuitry), software executing on a processor, or a combination of hardware and software.

Regarding implementations of the trained prefetch model 156 that are based on trees, a variety of tree configurations are disclosed. In one example, the trained prefetch model 156 includes a plurality of individual trees, each of which is associated with a particular hybrid prefetcher configuration. For inference, the inputs to each such tree include feature measurements—measurements of the hardware (such as a processor 151) that describe the state of the hardware in operation. Each tree provides an output value. In some examples, the trees are binary classifiers, and the outputs are certainty scores. The certainty scores reflect how certain it is that the hardware configuration associated with that tree is the "correct" configuration to use for the current hardware state. In other examples, the trees are regression trees that produce regression values (values that can vary continuously) as output. In an example, these regression values are predictions of some measure of performance (such as instructions per cycle) with the associated hardware configuration selected. In another example, the output values are ranks that indicate the relative benefit of selecting a particular prefetcher configuration based on the supplied feature measurements. As described elsewhere herein, these ranks indicate which "bin" out of a set of bins the predicted performance falls within, where the "bins" represent ranges of feature measurement values. The term "output value" when used to describe output from a tree refers either to certainty scores, regression values, or ranks.

In an example, each tree is associated with a different hardware configuration. In addition, in response to providing the input, including information about measured hardware characteristics (feature measurements—e.g., characteristics about the processor 151 as the processor is executing), to each tree, the tree provides an output value regarding whether the hardware configuration associated with that tree is to be used.

In another example, the trained prefetch model 156 includes a suite of forests. Each forest is a collection of trees and is associated with a different hardware configuration. Each tree in each forest accepts measured hardware characteristics (feature measurements) and provides an output value indicating whether to select the hardware configuration associated with that tree. It is permitted, though not required, for different trees in the same forest accept different inputs. In an example, for a forest associated with hardware configuration 1, a first tree of that forest accepts hardware factor 1 and hardware factor 2 as input and provides an output value as described above. A second tree of that forest accepts hardware factor 1 and hardware factor 3 (but not hardware factor 2) and provides an output value as described above.

After obtaining the output values for each tree of a forest, the hybrid prefetcher 154 combines these output values to produce a final output value for the hardware configuration associated with that forest. In various examples, combining the output values includes taking a mean of the output values from each tree, taking the mode of the output values from each tree, or combining the output values from each tree in a different way. The hybrid prefetcher 154 obtains the combined output value for each forest and selects a hardware configuration based on a comparison of these output values from each forest. In various examples, the hybrid prefetcher 154 selects the hardware configuration associated with the forest having the highest score, the lowest score, or having a score that satisfies some other criteria.

In some examples, the trained prefetch model 156 is a regression machine learning model. As is generally known, regression, in machine learning, is a technique whose output is a continuously varying variable. The trained prefetch model 156, implemented as a regression machine learning model, would have one tree or one forest per hardware configuration, and would output one or more continuously varying variables. In some examples, these variables include metrics about processor 151 execution with execution that results in the inputs to the trained prefetch model 156. In various examples, the variables include instructions per clock cycle, power used, memory bandwidth, or a variety of other performance metrics that describe how the processor 151 executes.

It should be understood that the training process for a regression machine learning model includes providing training data whose labels include values for the processor 151 metrics whose output is to be provided. In an example, where instructions per cycle is an output from the trained prefetch model 156, training data includes a sequence of instruction that exhibit certain feature metrics (e.g., feature metrics 186 described elsewhere herein), and detected instructions per cycle for the sequence of instructions as executed.

In various examples, the regression machine learning model is used with any of a variety of types of trained prefetch models 156. In one example, the regression machine learning model is used with a trained prefetch model 156 in which each hardware configuration is associated with a single tree (rather than a forest of trees as described). In another example, the regression machine learning model is used with a trained prefetch model 156 in which each hardware configuration is associated with a forest, as described elsewhere. In yet another example, the regression machine learning model is used with any other type of trained prefetch model 156. It is possible for a trained prefetch model 156 that is not tree-based to use regression.

In some examples, the trained prefetch model 156 is a model whose output is a rank, rather than a regression value or a certainty score. As described elsewhere herein, these ranks represent the predicted benefit of selecting a particular hardware configuration over another hardware configuration. In an example, the hybrid prefetcher 154 applies feature measurements to each of a plurality of trees to obtain a rank from each such tree. The hybrid prefetcher 154 identifies one of the ranks based on a selection criteria (such as highest or lowest), and subsequently operates according to the prefetcher configuration associated with the selected ranks. In various examples, each rank is associated with a "bin" or range of performance metric values observed for different hybrid prefetcher configurations. In other words, a trainer operates a computer system (e.g., the processor 151 and/or other elements) with different hybrid prefetcher configurations, obtains performance metrics values, and then "bins" those performance metric values into different ranges of values. Each range is associated with a different rank. The trainer associates the rank with the hybrid prefetcher configurations and generates the trained prefetch model 156 using the samples including the ranks and hybrid prefetcher configurations. Note that it is not necessary for the rank-based system to be used with a tree-based system. It is possible for a trained prefetch model 156 that is not tree-based to use the described ranking system.

In some examples, the rankings are normalized with respect to a baseline hybrid prefetcher configuration. In other words, a trainer 180 executes multiple software traces with different hybrid prefetcher configurations and obtains performance metrics for each such trace and for each such hybrid prefetcher configuration. For each trace, the trainer 180 then normalizes all measured performance metrics with respect to the performance metric obtained for a hybrid prefetcher configuration deemed to be "baseline." In an example, the baseline configuration includes all prefetcher techniques switched on. In other words, this baseline represents a configuration in which no prediction is made as to which techniques should be used—all are used, but not customizing prefetching in any way. In an example, normalizing means dividing the performance metric for each hardware configuration by the performance metric for the baseline. The trainer 180 then choses ranks based on which of a set of ranges the measured performance metrics fall within.

As described elsewhere herein, in some examples, the trained prefetch model 156 includes one or more decision trees. In some examples, these decision trees are organized in forests, with each forest associated with a different hardware configuration, and in other examples, the decision trees are individually associated with different hardware configurations (i.e., each individual tree is not included in a forest and is, itself, associated with a hardware configuration). Additional details regarding these trees are now provided.

Details regarding decision trees that are part of the trained prefetch model 156 are now provided. The trained prefetch model 156 includes data that specifies a plurality of decision trees used by the prefetcher 154 to determine which prefetch techniques to use, given measurements obtained from the one or more processors 151. Each tree indicates whether a particular hybrid prefetcher configuration should be used. A hybrid prefetcher configuration is defined as, for each prefetcher technique of the hybrid prefetcher 154, whether that technique is switched on or off. In an example, the hybrid prefetcher 154 uses a stride-based prefetch technique and a stream-based prefetch technique. Because there are two prefetching techniques, the number of possible prefetcher configurations is four—both on, both off, stride on and stream off, and stream on and stride off. Although this specific example of a hybrid prefetcher is described, this example should not be taken to be limiting, and the hybrid prefetcher 154 may implement any combination of prefetching techniques.

The trees of the trained prefetch model 156 are binary decision trees. Each node of each tree is either a leaf node or is a decision node that points to two (or more) different paths, where the choice of which path to take is dependent on a measurement of a computing feature. The leaf nodes indicate a certainty score or a rank for non-regression trees, or regression values (e.g., instructions per cycle) for regression trees. Additional details regarding the decision trees are provided elsewhere herein.

In use, the hybrid prefetcher 154 traverses the trees in the trained prefetch model 156 to determine which hybrid prefetcher 154 configuration to use. In an example, traversing a particular tree is performed as follows. The hybrid prefetcher 154 begins at a beginning ("root") node. If the root node is a decision node, then the hybrid prefetcher 154 determines the measurement specified by that decision node and obtains the threshold specified by that decision node. The measurement is a measurement of some aspect of computing performance, and is also referred to as a "feature measurement" herein. Examples of such aspects of computing performance include number of misses in a level 1 data cache, number of stores committed, number of microcode dispatch breaks, number of level 2 cache lines evicted, and others. Each decision node specifies that if the measurement is greater than a threshold specified by the node, then the hybrid prefetcher 154 traverses to a "greater than" path, to a different node whose identity is specified by the decision node. Each decision node also specifies that if the measurement is not greater than the threshold, then the hybrid prefetcher 154 traverses to a "not greater than" path, to a different node whose identity is specified by the decision node. For a root node that is a decision node, the hybrid prefetcher 154 traverses to the node specified by the measurement for that node, taking one of the two paths specified based on the value actually measured for the corresponding hardware (such as a processor 151).

When the hybrid prefetcher 154 arrives at a leaf node, the hybrid prefetcher 154 determines the value specified by that node (a "leaf node value"). As described elsewhere herein, in various examples, the leaf value is a certainty score in examples where the trees are binary classifiers, a rank, or a regression value where the trees are regression trees.

For examples where the leaf node value is a certainty score, when the hybrid prefetcher 154 arrives at a leaf node, the hybrid prefetcher determines, as the leaf node value, the certainty score identified for that leaf node. A certainty score is a value that identifies how certain the hybrid prefetcher 154 is that the hybrid prefetcher configuration associated with that tree is the "most desirable" configuration, given the current state of the hardware (i.e., the values of the various measurements used to traverse the tree). For examples where the leaf node includes a rank, when the hybrid prefetcher 154 arrives at that leaf node, the hybrid prefetcher154 determines, as the leaf node value, the rank specified by that leaf node. For examples where the leaf node value includes a regression value, when the hybrid prefetcher 154 arrives at a leaf node, the hybrid prefetcher 154 determines, as the leaf node value, the regression value at the leaf node.

As described elsewhere herein, the trained prefetch model 156 is, in some implementations, a model that includes one tree per hardware configuration (a "suite of trees") and in other implementations, a model that includes one forest per hardware configuration (a "suite of forests"). In the example where the trained prefetch model 156 is a suite of trees, the hybrid prefetcher 154 traverses multiple trees to obtain leaf node values for the trees and compares the leaf node values. Then the hybrid prefetcher 154 selects the hybrid prefetcher configuration corresponding to a selected leaf node value (e.g., the highest leaf node value, lowest leaf node value, or a leaf node value selected based on some other selection criteria). The hybrid prefetcher 154 operates according to the selected hybrid prefetcher configuration. In the example where the trained prefetch model 156 is a suite of forests, the hybrid prefetcher 154 traverses multiple trees for each forest to obtain a leaf node value for each tree and combines the leaf node values for the trees in each forest to obtain forest values (e.g., by taking a mean or a mode). The hybrid prefetcher 154 then selects a hybrid prefetcher configuration corresponding to the forest whose forest value meets a selection criterion (e.g., the highest forest value, lowest forest value, or a forest value meeting some other selection criterion). In some alternatives, hybrid prefetcher configurations within a threshold percentage of the highest certainty score are identified and one is randomly selected. In examples where the leaf node values are ranks, the hybrid prefetcher 154 selects a particular hybrid prefetcher configuration according to one of a variety of techniques. In one example technique, the hybrid prefetcher 154 selects the hybrid prefetcher configuration associated with a rank that is deemed the "best" (e.g., the highest or lowest). In another example, the hybrid prefetcher 154 selects the hybrid prefetcher configuration associated with a more complicated selection function, such as performing a statistical analysis of performance associated with the ranks. In another example, the hybrid prefetcher 154 performs a tie breaker in the instance that there are several hybrid prefetcher configurations with the same rank. In an example, the tie breaker includes selecting a hybrid prefetcher configuration that is most commonly used, selecting a hybrid prefetcher configuration that has, on average, the "best" of a particular performance metric (e.g., the highest instructions per cycle), selecting a hybrid prefetcher configuration that is closest to the baseline, or a hybrid prefetcher configuration randomly. Operating according to a hybrid prefetcher configuration means operating with the prefetching techniques implemented by the hybrid prefetcher turned on or off according to the hybrid prefetcher configuration. It should be understood that trained prefetch models 156 other than those based on a suite of trees or a suite of forests are contemplated herein.

Figure 1C:
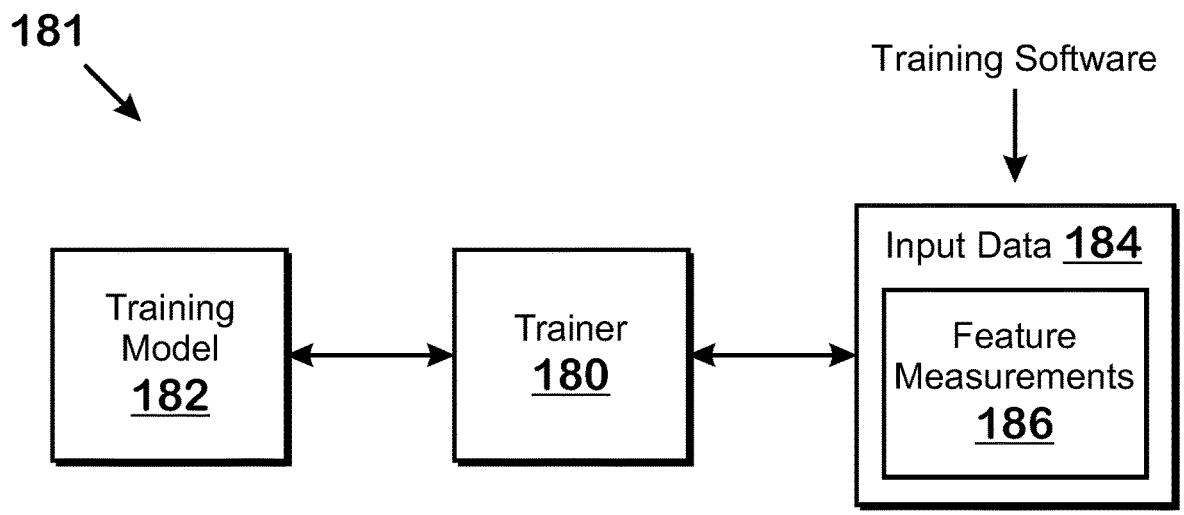
FIG. 1C illustrates a hybrid prefetch model training system, according to an example.

FIG. 1C illustrates a hybrid prefetch model training system 181, according to an example. The hybrid prefetch model training system 181 includes a trainer 180, a training model 182, and input data 184, which includes feature measurements 186. The trainer 180 generates the training model 182 based on the input data 184. After training, the training model 182 becomes the trained prefetch model 156. The trainer 180 may be implemented as software or firmware executing on a processor (such as a processor illustrated or described in FIG. 1A), or as fixed function circuitry (such as an application specific integrated circuit). The training model 182 may be stored in any memory or storage where such storing is appropriate.

As stated elsewhere herein, in some implementations, the training model 182 includes a plurality of trees. In such implementations, any technically feasible technique to generate the trees may be used. Some example machine learning techniques for building trees include: the iterative dichotomiser 3 algorithm, the C4.5 algorithm, the classification and regression tree ("CART") algorithm, the Chi-squared Automatic Interaction Detector, multivariate adaptive regression spline, "ctree: Conditional Interference Trees," and Random Forest. Although some machine learning techniques for building trees are described, any technically feasible technique for building trees could be used.

In some implementations, the training system 181 is activated "offline," meaning by a computer system other than the computer system in which the training model 182 is used to make decisions on which prefetcher to use. Then the training model 182 is provided to a computer system and is used to make decisions on which prefetcher to use. In some implementations, the training system 181 is activated "online," meaning that the computer system that includes the prefetching system 150 also includes the hybrid prefetch model training system 181, and activates the hybrid prefetch model training system 181 to train the trained prefetch model 156 (where the trained prefetch model 156 is the same thing as the training model 182). In some implementations, the training system 181 is activated both in an offline mode and in an online mode, in which an initial training model 182 is generated in an offline manner and is then revised online.

Generating the trees is performed as a supervised machine learning task for creating a classification model, where each tree is classification model. The input data includes input data elements, each of which includes a set of feature measurements and a label. In some examples, a binary classification is used, and in other examples, where regression is used, the labels are performance metrics.

For binary classification, for each tree, two classes are possible: a class indicating that the hybrid prefetcher configuration associated with the tree should be used, and a class indicating that the hybrid prefetcher configuration associated with the tree should not be used. For regression, the "classes" for the tree are the performance metrics. For rankings, the "classes" are each rank.

Training the classifier involves the trainer 180 executing training software in the various possible hybrid prefetcher configurations and obtaining and recording feature measurements for the software (where, as described elsewhere herein, the feature measurements are measurements of various aspects of the hardware (such as the processor(s) 151 and cache 152) in each hybrid prefetcher configuration). In addition, for each hybrid prefetcher configuration the trainer 180 also records one or more performance metrics for the different hybrid prefetcher configurations.

For the binary classification, the trainer 108 derives a classification for the executed training software from the performance metric. In an example, the performance metric is instructions executed per cycle, although any technically feasible performance metric is used. To derive the classification for an item of training software, the trainer 180 determines which hybrid prefetcher configuration is deemed to have the best performance metric. In the example that the performance metric is instructions per cycle, the hybrid prefetcher configuration with the "best" performance metric is the hybrid prefetcher for which the instructions per cycle is the highest. The trainer 180 classifies the input data 184—the feature measurements for the executed software—as having the "most desirable" hybrid prefetcher configuration for the hybrid prefetcher configuration with the "best" performance metric. In some implementations, the trainer 180 also classifies the input data 184 as having the "most desirable" hybrid prefetcher configuration for hybrid prefetcher configurations with a performance metric that is within a threshold percent of the "best" performance metric. In an example where the performance metric is instructions per cycle, an example threshold percent is 95 percent. According to this example, the feature measurements for the software are classified as having the "most desirable" hybrid prefetcher configuration for the hybrid prefetcher configuration having the highest instructions per cycle and also for the hybrid prefetcher configurations having at least 95% of the highest instructions per cycle, if any such hybrid prefetcher configurations exist. A classification of "most desirable" may be associated with a score of 1 and a classification of "less desirable" may be associated with a score of 0. For regression, the trainer 108 does not need to derive a classification based on the metric and simply uses the measured performance metrics as the labels for the data.

The above classification is performed for a number of traces, where each trace is a sequence of program flow derived from a software instance. The output of classification is, for any particular hybrid prefetcher configuration, a set of training data. Each item ("feature vector") of training data in a set corresponds to a trace and includes a set of measurements for the features ("feature measurements 186") that were measured for the trace, as well as a classification, and an identification of the hybrid prefetcher configuration under which the feature measurements were taken.

Using any technically feasible machine learning technique, such as those described elsewhere herein, the trainer 180 generates the training model 182 based on the input data 184. As is generally known, machine learning techniques can be used to generate a predictive model that predicts a particular classification or generates a continuous output variable for a given input, where the predictive model is generated based on input data that provides classifications or regression data for training input. Using such a technique, the trainer 180 generates a predictive model that can be used by the hybrid prefetcher 154 to evaluate measured features from the processor(s) 151, cache 152, and/or other systems, in order to make a determination on which hybrid prefetcher configuration to use.

As described elsewhere herein, in examples in which trees are used, the training model 182 includes multiple decision trees—one (suite of trees) or more (suite of forests) for each hybrid prefetcher configuration.

For binary classification, each decision tree has the capacity to predict whether the hybrid prefetcher configuration associated with the decision tree is desirable or not. More specifically, as described elsewhere herein, each decision tree provides a certainty score that indicates how certain it is that the hybrid prefetcher configuration associated with the decision tree is the "most desirable" hybrid prefetcher configuration. In some implementations, the classifications of the input data 184 are scores—either 0 or 1. A value of 0 represents that the hybrid prefetcher configuration associated with the item of input data is not a "most desirable" hybrid prefetcher configuration and a value of 1 represents that the hybrid prefetcher configuration is a "most desirable" hybrid prefetcher configuration. The leaf nodes of each tree indicate a certainty score between 0 and 1, which is between the two possible classification scores mentioned above. In a sense, the certainty scores of the leaf nodes represent values intermediate between the 0 and 1 scores, and can therefore be seen as representing the certainty with which the model predicts the associated hybrid prefetcher configuration is appropriate for a set of feature measurements that arrives at the node. For regression, the outputs from each decision tree or forest is a feature measurement. For ranking, the outputs from each tree is a rank.

Additional data is used by the trainer 180 to validate the training model 182. In general, validation is a technique in machine learning where data that is different from the data used to generate a predictive model is used to test the predictive model. The validation data is different in order to test for overfitting—the condition where the trained model is too specific to the data used to train the model and thus is difficult or impossible to use for predictive purposes. The validation data is similar to the data used as input to generate the training model 182.

In some implementations, the training process is repeated with varying hyperparameters to find parameters deemed to be the "best." Some example hyperparameters include maximum tree depth, minimum number of elements a leaf must contain, the maximum number of nodes allocated to a tree, the maximum number of feature types.

Figure 2:
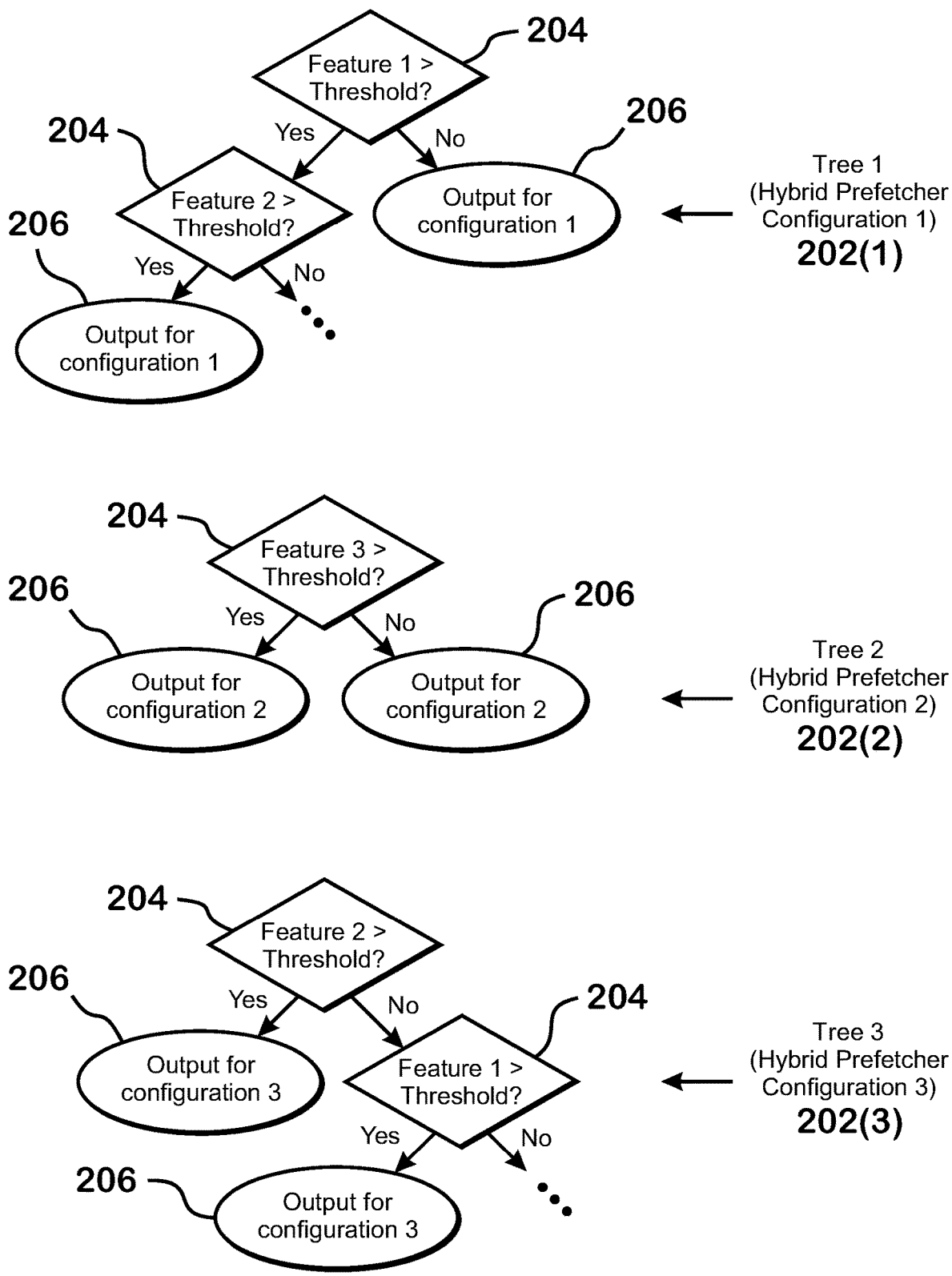
FIG. 2 illustrates an example set of trees for making hybrid prefetcher reconfiguration decisions.

FIG. 2 illustrates an example set of trees for a system in which the trained prefetch model 156 is a suite of trees. In other words, FIG. 2 illustrates aspects of a trained prefetch model 156 that includes one tree per hardware configuration. Tree 1 202(1) is associated with hybrid prefetcher configuration 1, which represents a specific configuration of prefetching techniques of the hybrid prefetcher 154 switched on and off. To use tree 1 202(1) to determine an output value for hybrid prefetcher configuration 1, given a set of feature measurements, the hybrid prefetcher 154 traverses the tree. At the root node, which is a decision node 204, the hybrid prefetcher 154 makes a determination of whether a particular feature measurement is above a threshold specified by that decision node 204. If the feature measurement is above the threshold, then the hybrid prefetcher 154 proceeds to the left node which is a decision node 204 and if the feature measurement is not above the threshold, then the hybrid prefetcher 154 proceeds to the right node which is a leaf node 206 (and thus determines the output value for hybrid prefetcher configuration 1, given the set of feature measurements).

At the left decision node, the hybrid prefetcher 154 determines whether feature 2 is above a threshold specified for that decision node. If feature 2 is above the threshold, then the hybrid prefetcher 154 proceeds to the left (which is a leaf node and thus leads to an output value being determined for the set of feature measurements) and if feature 2 is not above the threshold, then the hybrid prefetcher 154 proceeds to the right. For brevity, the right side is omitted, but additional nodes are present in tree 1.

For tree 2 202(2), which is associated with hybrid prefetcher configuration 2, the hybrid prefetcher 154 examines feature 3, as specified by the root node, which is a decision node 204. If feature 3 is above a threshold specified by the decision node 204, then the hybrid prefetcher 154 proceeds to the leaf node 206 on the left side and if feature 3 is not above the threshold, then the hybrid prefetcher 154 proceeds to the leaf node 206 on the right side. For either leaf node, the hybrid prefetcher 154 determines the output value for hybrid prefetcher configuration 2 as specified by that leaf node 206.

For tree 3 202(3), which is associated with hybrid prefetcher configuration 3, the hybrid prefetcher 154 examines feature 2, as specified by the root node, which is a decision node 204. If feature 2 is above a threshold specified by the decision node 204, then the hybrid prefetcher proceeds to the left side and if feature 2 is not above the threshold specified by the decision node 204, then the hybrid prefetcher proceeds to the right side. At the left side, which is a leaf node 206, the hybrid prefetcher determines the output value for hybrid prefetcher configuration 3 as specified by that leaf node 206. At the right side, the hybrid prefetcher 154 determines whether feature 1 is above a threshold. If feature 1 is above the threshold, then the hybrid prefetcher 154 proceeds to the left side, where there is a leaf node 206 that specifies a output value for the hybrid prefetcher configuration 3. If feature 1 is not above the threshold, then the hybrid prefetcher 154 proceeds to the right side. Additional nodes would be present but are not illustrated in FIG. 2 for brevity.

Figure 3:
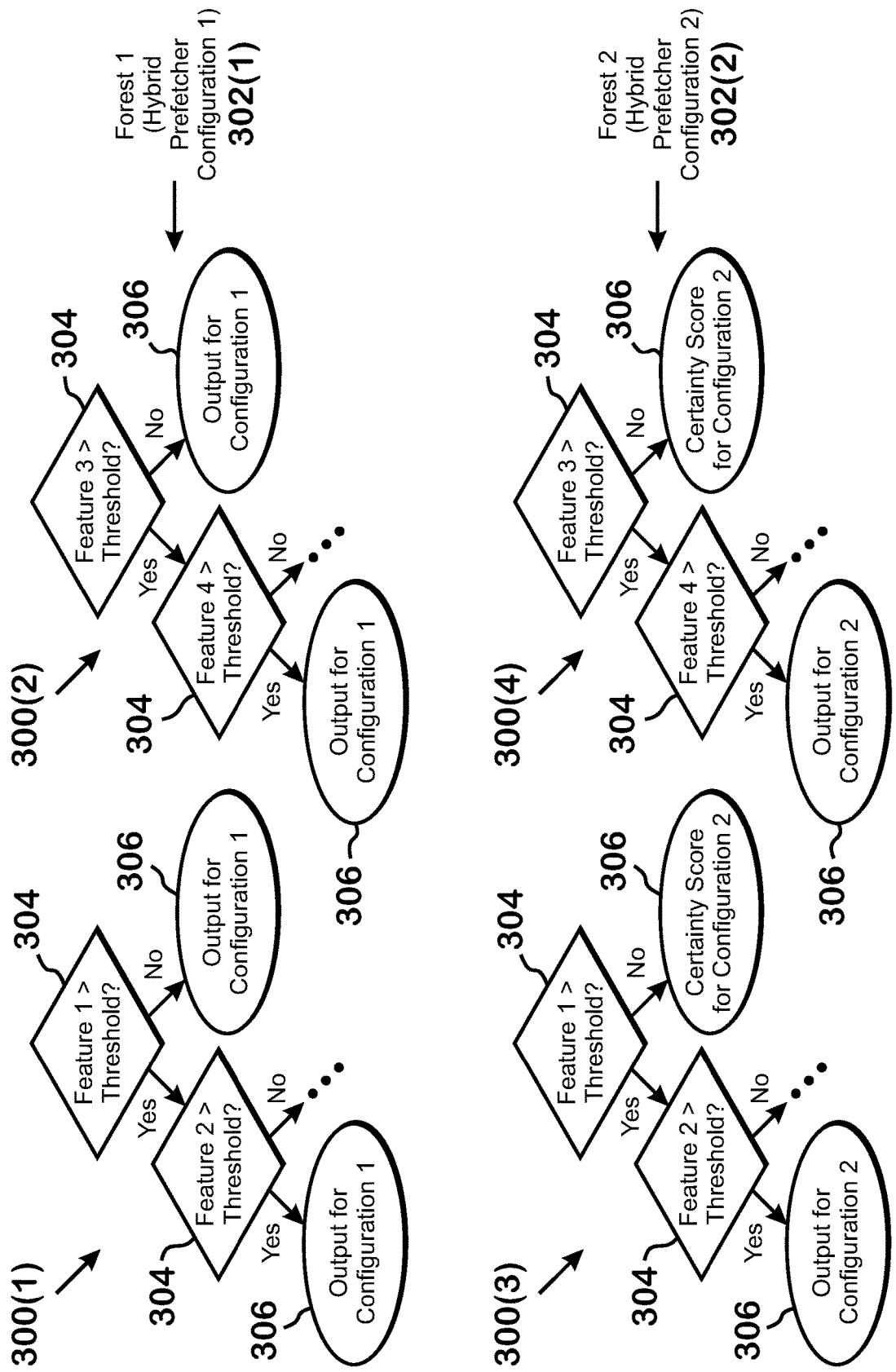
FIG. 3 illustrates an example set of forests for making hybrid prefetcher reconfiguration decisions.

FIG. 3 is a diagram illustrating a suite of random forests, as part of the trained prefetch model 156, according to an example. The suit of random forests includes multiple trees 300 per hardware configuration. Each tree 300 is similar to the trees 202 of FIG. 2. However, there are multiple trees 300 associated with each hardware configuration shown. In the example, tree 300(1) and tree 300(2) are associated with forest 1 302(1) and tree 300(3) and tree 300(4) are associated with forest 2 302(2).

In use, the hybrid prefetcher 154 traverses each tree 300 in a similar manner as with respect to FIG. 2. However, to obtain a result for a particular hardware configuration, the hybrid prefetcher 154 traverses each tree 300 that is associated with that hardware configuration and then combines the output results from those trees 300 to obtain the output result for the hardware configuration. As described elsewhere herein, in different implementations, the outputs from trees 300 are certainty scores, for implementations in which the trees are binary classifiers, or the outputs from trees 300 are one or more regression values. To use a forest 302 to determine an output value for a particular hardware configuration, the hybrid prefetcher 154 traverses the trees 300 of the forest 302 as described with respect to FIG. 2, to obtain outputs for each such tree 300 associated with the hardware configuration. For example, the hybrid prefetcher 154 examines the non-leaf node 304, starting at the root node, comparing the threshold values at each node to the measurements taken, and following the tree as dictated by these threshold values. The hybrid prefetcher 154 determines, as output for the tree 300, the leaf node 306 arrived at based on this traversal. Once the hybrid prefetcher 154 obtains outputs for multiple trees 300 (such as all trees 300) of a forest 302, the hybrid prefetcher 154 combines these outputs to obtain an output for the forest 302. In various examples, this combination includes obtaining a mean or a mode of the output values, or includes obtaining a combination of the output values in some other manner.

Figure 4A:
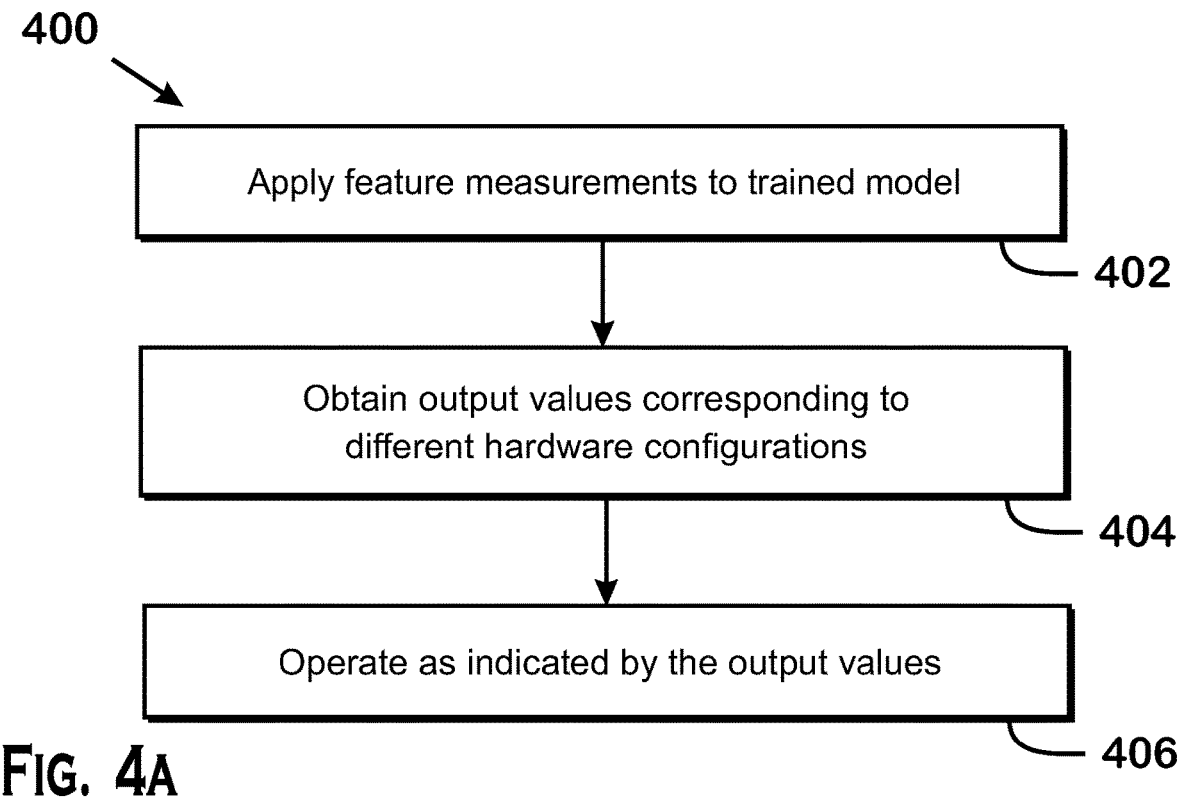
FIG. 4A is a flow diagram of a method for operating a hybrid prefetcher according to a trained prefetch model, according to an example.

FIG. 4A is a flow diagram of a method 400 for operating a hybrid prefetcher 154 according to a trained prefetch model 156, according to an example. Although described with respect to the system of FIGS. 1A-3, those of skill in the art will understand that any system, configured to perform the steps of method 400 in any technically feasible order, falls within the scope of the present disclosure.

The method 400 begin at step 402, where a hybrid prefetcher 154 applies feature measurements to a trained model 156. As described elsewhere herein, the feature measurements are measurements associated with an executing processor 151. Examples of such measurements include measurements of number of misses in a level 1 data cache, number of stores committed, number of microcode dispatch breaks, number of level 2 cache lines evicted, and others, and define the operating state of the computing device that the hybrid prefetcher 154 is performing prefetching operations for.

In general, applying the obtained measurements to the trained model involves processing the trained model in some way for the purpose of obtaining an output that indicates the desirability of executing with one or more particular prefetcher configurations. In some examples, applying the feature measurements to the trained model includes traversing one or more trees for either a suite of trees or suite of forests trained model. In an example, the hybrid prefetcher 154 traverses a tree as described with respect to FIG. 2 or 3.

At step 404, the hybrid prefetcher 154 obtains output values from the trained model. These output values indicate which prefetcher configuration to use. In examples in which the trained model includes a binary classifier, the output values are certainty scores. In examples in which the trained model includes a regression model, the output values are regression values.

At step 406, the hybrid prefetcher 154 operates as indicated by the output values. In examples in which the trained model includes a regression model, the hybrid prefetcher 154 obtains regression values corresponding to different hybrid prefetcher configurations. The hybrid prefetcher 154 selects a hybrid prefetcher configuration as the configuration associated with the most "desirable" regression value. In various examples, the regression values include hardware performance metrics such as instructions per cycle, memory bandwidth, power consumed, or the like. In such examples, the hybrid prefetcher 154 selects the configuration associated with the most desirable performance metric. In examples, the hybrid prefetcher 154 selects the configuration associated with the highest instruction per cycle count, the lowest power consumption, or the lowest memory bandwidth consumption. In examples in which the trained model includes a classifier, the hybrid prefetcher 154 selects the configuration associated with a most desirable (for example, the highest) certainty score.

Figure 4B:
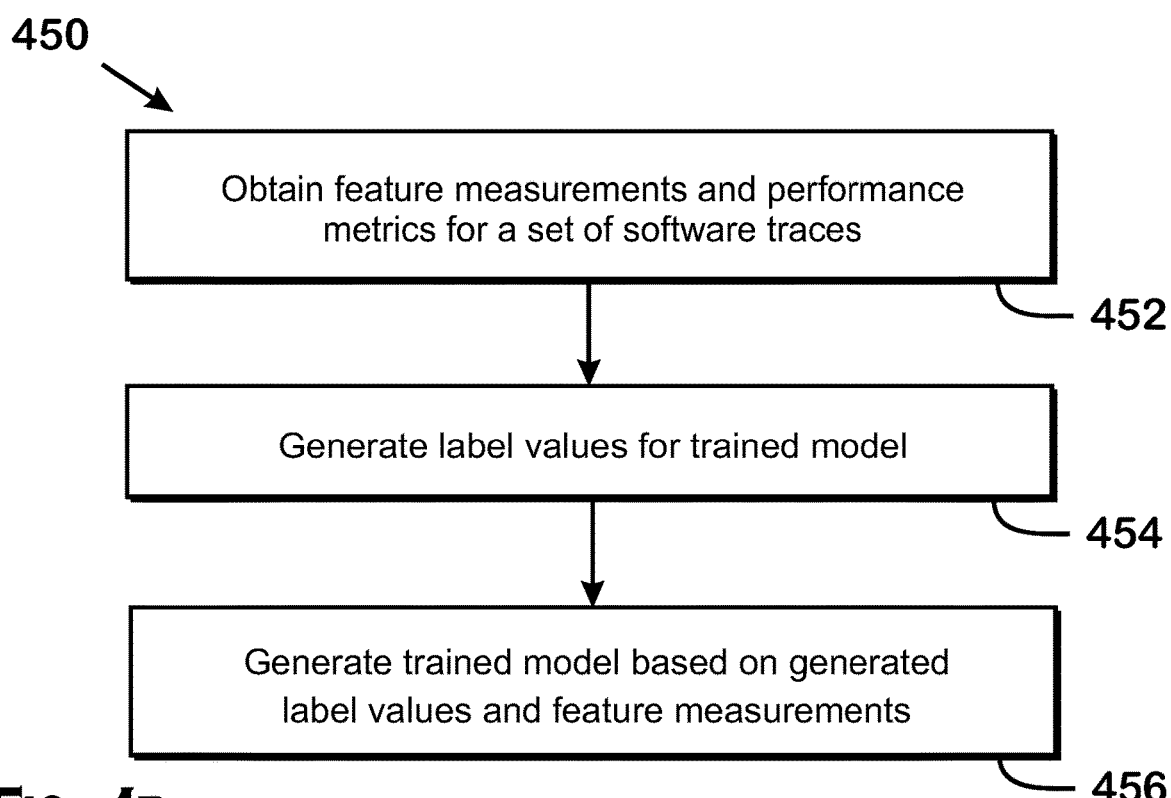
FIG. 4B is a flow diagram of a method for generating a trained prefetcher model, according to an example.

FIG. 4B is a flow diagram of a method 450 for generating a trained prefetcher model, according to an example. Although described with respect to the system of FIGS. 1A-3, those of skill in the art will understand that any system, configured to perform the steps of method 450 in any technically feasible order, falls within the scope of the present disclosure.

At step 452, the hybrid prefetcher obtains feature measurements and performance metrics for a set of software traces. In an example, the trainer 180 causes a plurality of traces to be executed. For each trace, the trainer 180 causes the trace to be executed at least once for each prefetcher configuration. For each such execution, the trainer 180 collects a set of feature measurements—measurements of each feature for which feature collection is to be performed. Example features include number of misses in a level 1 data cache, number of stores committed, number of microcode dispatch breaks, number of level 2 cache lines evicted, and others. In addition, for each such execution, the trainer 180 obtains a performance metric that indicates how "well" the trace was performed with a given prefetcher configuration. In an example, a performance metric is instructions per cycle.

At step 454, the trainer 180 generates label values or the trained model. The labels are labels for "samples" that include execution of a software trace for a given hybrid prefetcher configuration. In some implementations, where the trained model includes binary classifiers, the label values include indications of which hybrid prefetcher configuration is "most desirable" for a given software trace. In some implementations, where the trained model includes regression classifiers, the labels include the performance metrics. In other words, for a regression model, the labels are the values to be output from the regression model. In other implementations, a ranking system is used.

With a ranking system, the trainer 180 generates ranks based on the performance metrics. More specifically, for all hybrid prefetcher configurations for a given software trace, the trainer 180 collects the generated performance metrics. The trainer 180 "bins" these performance metrics, assigning the performance metrics to "bins" of performance metric ranges. In an example, the obtained performance metrics are from 1-100. The trainer 180 generates 10 bins, each having a range within the 1-100 range. A numerical identifier for each bin is the label.

At step 456, the trainer 180 generates trained model based on the labels and feature measurements. In examples where a binary classifier is used, the trainer 180 generates a trained model include a plurality of trees, where each tree is associated with a hardware configuration. When a tree is traversed using the feature measurements, a hybrid prefetcher 154 arrives at a particular non-leaf node 206 to obtain an output value, including a certainty score, a ranking, or a regression value. The hybrid prefetcher 154 selects a configuration based on these output values as described elsewhere herein.

In the example where the labels are binary classifications, for any particular trace, the trainer 180 determines the performance metrics associated with the hybrid prefetcher configurations for that trace. Then, the trainer 180 selects one or more of the performance metrics based on selection criteria and labels the feature measurements associated with the selected performance metrics as being "most desirable," while labeling the feature measurements associated with the non-selected performance metrics as not being "most desirable."

In an example, the trainer 180 labels the set of feature measurements associated with the highest (or lowest) performance metric as being "most desirable." In an example, the trainer 180 also labels one or more additional sets of features measurements as being most desirable where those feature measurements have performance metrics within a threshold percentage of the highest (or lowest) performance metric.

The result is a set of training data, where each item of training data includes a hybrid prefetcher configuration, a set of performance metrics for a trace, and a classification as either most desirable or not desirable. Conceptually the training data indicates, for any given trace, which prefetch configuration(s) is desirable. In terms of machine learning, for each hybrid prefetcher configuration, the training data includes a set of feature measurements, and whether those feature measurements are classified as "most desirable" or "less desirable" (or "not desirable"). This training data can also be viewed in terms of a separate set of training data for each hybrid prefetcher configuration. Each set of training data classifies the training input of feature measurements as either predicting that the associated hybrid prefetcher configuration should be used (where the feature measurements are classified as "most desirable") or predicting that the associated hybrid prefetcher configuration should not be used (where the feature measurements are classified as "less desirable").

The trainer 180 generates the trained models based on the labels. For generating decision trees, any technically feasible machine learning technique can be used. Some possible techniques include the nearest neighbor algorithm, a naive Bayes algorithm, a tree-based classifier such as a C4.5 decision tree classifier, a Ripper classifier, a support vector machine algorithm, a logistic regression algorithm, a multi-layer perceptron neural network with backward propagation technique, and a radial basis function neural network technique.

In some examples, after generating the trees, the output is validated with validation data sets. The trainer 180 also identifies appropriate hyperparameters (e.g., by performing an exhaustive search) to use. Some example hyperparameters include maximum tree depth, minimum number of elements a leaf must contain, maximum number of nodes allocated to a tree, and maximum number of features allowed.

In some implementations, the trained prefetch model 156 is static and is not retrained during runtime. In other implementations, the trained prefetch model 156 undergoes retraining during runtime. In some implementations, the trained prefetch model 156 includes a fixed number of nodes. A random access memory ("RAM") includes one slot for each node. In such implementation, retraining occurs by modification of individual nodes (e.g., by modifying the thresholds for decision nodes or by modifying the certainty scores for leaf nodes). In such implementations, the modification of individual nodes is performed by overwriting the associated RAM slot.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for identifying a hardware configuration, the method comprising:
    applying feature measurements to a trained model, wherein the trained model includes a plurality of sets of trees, each different set of trees corresponding to a different hardware configuration;
    for each set of trees, combining output values of each member tree of the set of trees to form a combined output value for the set, wherein the combined output value is generated from a plurality of certainty scores, wherein each certainty score is specified by a different tree of the set of trees;
    selecting a hardware configuration based on the combined output values of the plurality of sets of trees, by selecting a hardware configuration of a set of trees that has the highest combined output value out of a plurality of combined output values corresponding to the plurality of sets of trees; and
    operating a computer processor according to the selected hardware configuration,
    wherein the output values comprise certainty scores, rankings, or regression values.

2. The method of claim 1, wherein applying the feature measurements to the trained model comprises:
    traversing one or more trees of the trained model, comparing the feature measurements to thresholds of the one or more trees to arrive at a leaf node.

3. The method of claim 2, wherein obtaining the output values includes obtaining the output values from leaf nodes of the one or more trees of the trained model.

4. The method of claim 2, wherein the leaf nodes of the trees include regression values.

5. The method of claim 1, wherein the output values comprise ranking, and the rankings comprise bins of feature measurements.

6. The method of claim 1, wherein each set of trees comprises a trained forest.

7. The method of claim 1, wherein combining the output values comprises taking a mean or a mode of the output values.

8. A system for identifying a hardware configuration, the system comprising:
    a processor; and
    a processor reconfiguration unit configured to:
        apply feature measurements to a trained model, wherein the trained model includes a plurality of sets of trees, each different set of trees corresponding to a different hardware configuration;
        for each set of trees, combine output values of each member tree of the set of trees to form a combined output value for the set, wherein the combined output value is generated from a plurality of certainty scores, wherein each certainty score is specified by a different tree of the set of trees;
        select a hardware configuration based on the combined output values of the plurality of sets of trees, by selecting a hardware configuration of a set of trees that has the highest combined output value out of a plurality of combined output values corresponding to the plurality of sets of trees; and
        configure the processor to operate according to the selected hardware configuration,
        wherein the output values comprise certainty scores, rankings, or regression values.

9. The system of claim 8, wherein applying the feature measurements to the trained model comprises:
    traversing one or more trees of the trained model, comparing the feature measurements to thresholds of the one or more trees to arrive at a leaf node.

10. The system of claim 9, wherein obtaining the output values includes obtaining the output values from leaf nodes of the one or more trees of the trained model.

11. The system of claim 9, wherein the leaf nodes of the trees include regression values.

12. The system of claim 8, wherein the output values comprise ranking, and the rankings comprise bins of feature measurements.

13. The system of claim 8, wherein each set of trees comprises a trained forest.

14. The system of claim 8, wherein combining the output values comprises taking a mean or mode of the output values.

15. A processor comprising:
    one or more caches;
    a hybrid prefetcher configured to perform prefetching operations on the one or more caches; and
    a prefetch reconfiguration unit, configured to:
        apply feature measurements to a trained model, wherein the trained model includes a plurality of sets of trees, each different set of trees corresponding to a different hardware configuration;

for each set of trees, combine output values of each member tree of the set of trees to form a combined output value for the set, wherein the combined output value is generated from a plurality of certainty scores, wherein each certainty score is specified by a different tree of the set of trees;

select a hardware configuration based on the combined output values of the plurality of sets of trees, by selecting a hardware configuration of a set of trees that has the highest combined output value out of a plurality of combined output values corresponding to the plurality of sets of trees; and configure the hybrid prefetcher to operate according to the selected hardware configuration, wherein the output values comprise certainty scores, rankings, or regression values.

16. The processor of claim 15, wherein applying the feature measurements to the trained model comprises:

traversing one or more trees of the trained model, comparing the feature measurements to thresholds of the one or more trees to arrive at a leaf node.

17. The processor of claim 16, wherein obtaining the output values includes obtaining the output values from leaf nodes of the one or more trees of the trained model.

18. The processor of claim 16, wherein the leaf nodes of the trees include regression values.

19. The processor of claim 15, wherein the output values comprise ranking, and the rankings comprise bins of feature measurements.

20. The processor of claim 15, wherein each set of trees comprises a trained forest.

* * * * *